(12) United States Patent
Yang et al.

(10) Patent No.: US 8,411,065 B2
(45) Date of Patent: Apr. 2, 2013

(54) TOUCHPAD WITH A DOUBLE-LAYER PRINTED CIRCUIT BOARD STRUCTURE

(75) Inventors: Jianbo Yang, Shenzhen (CN); Bangjun He, Shenzhen (CN); Yun Yang, Shenzhen (CN); Wei Feng, Shenzhen (CN)

(73) Assignee: BYD Company Ltd., Shenzhen (CN)

( * ) Notice: Subject to any disclaimer, the term of this patent is extended or adjusted under 35 U.S.C. 154(b) by 660 days.

(21) Appl. No.: 12/630,782

(22) Filed: Dec. 3, 2009

(65) Prior Publication Data
US 2011/0025615 A1    Feb. 3, 2011

(30) Foreign Application Priority Data

Jul. 30, 2009   (CN) ...................... 2009 2 0134417 U (51) Int. Cl.
*G06F 3/042* (2006.01)
(52) U.S. Cl. ...................... 345/174; 345/176; 178/18.06
(58) Field of Classification Search .................. None
See application file for complete search history.

(56) References Cited

U.S. PATENT DOCUMENTS

2004/0178997 A1*   9/2004  Gillespie et al. .............. 345/173
2008/0007534 A1*   1/2008  Peng et al. ..................... 345/173
2008/0048997 A1*   2/2008  Gillespie et al. .............. 345/174

FOREIGN PATENT DOCUMENTS

| CN | 101038385 A | 9/2007 |
| CN | 101075169 A | 11/2007 |

* cited by examiner

*Primary Examiner* — Adam R Giesy
(74) *Attorney, Agent, or Firm* — Morgan Lewis & Bockius LLP (57) ABSTRACT

The present invention provides a touchpad with a double-layer printed circuit board structure. The touchpad comprises an upper layer, a bottom layer, a first conductor; and a second conductor; wherein the upper layer is configured to act as a touch-sensitive zone, and comprises a plurality of first conductive units, a first conductive wire and a plurality of second conductive units; the bottom layer comprises a wire connecting zone and a component zone, wherein the wire connecting zone further includes a second conductive wire and a connecting line configured to be electrically coupled to the component zone; and the first conductor and the second conductor are configured to connect the upper layer to the bottom layer; wherein the first and the second conductive units are each serially-connected to form a first touch-sensitive line and a second touch-sensitive line, respectively.

11 Claims, 7 Drawing Sheets

*PRIOR ART*

TOUCHPAD WITH A DOUBLE-LAYER PRINTED CIRCUIT BOARD STRUCTURE

CROSS-REFERENCE TO RELATED APPLICATION

This application claims priority to and benefit of Chinese Patent Application Serial No. 200920134417.1, filed in the State Intellectual Property Office of the P. R. China on Jul. 30, 2009, the entire contents of which are incorporated herein by reference.

BACKGROUND OF THE INVENTION

1. Field of the Invention

The present invention relates to a touchpad, and in particular, relates to a touchpad with a double-layer printed circuit board structure.

2. Background of the Related Art

The touchpad has been widely used in electronic products, such as portable computers, PDAs, mobile telephones and other electronic systems. A touchpad apparatus comprises a flat screen on which a user moves the cursor using fingers or conductive equipments such as touch pens. The touchpad apparatus can also be used for extended functions, for example, the function of simulating keyboard input.

Figure 1:
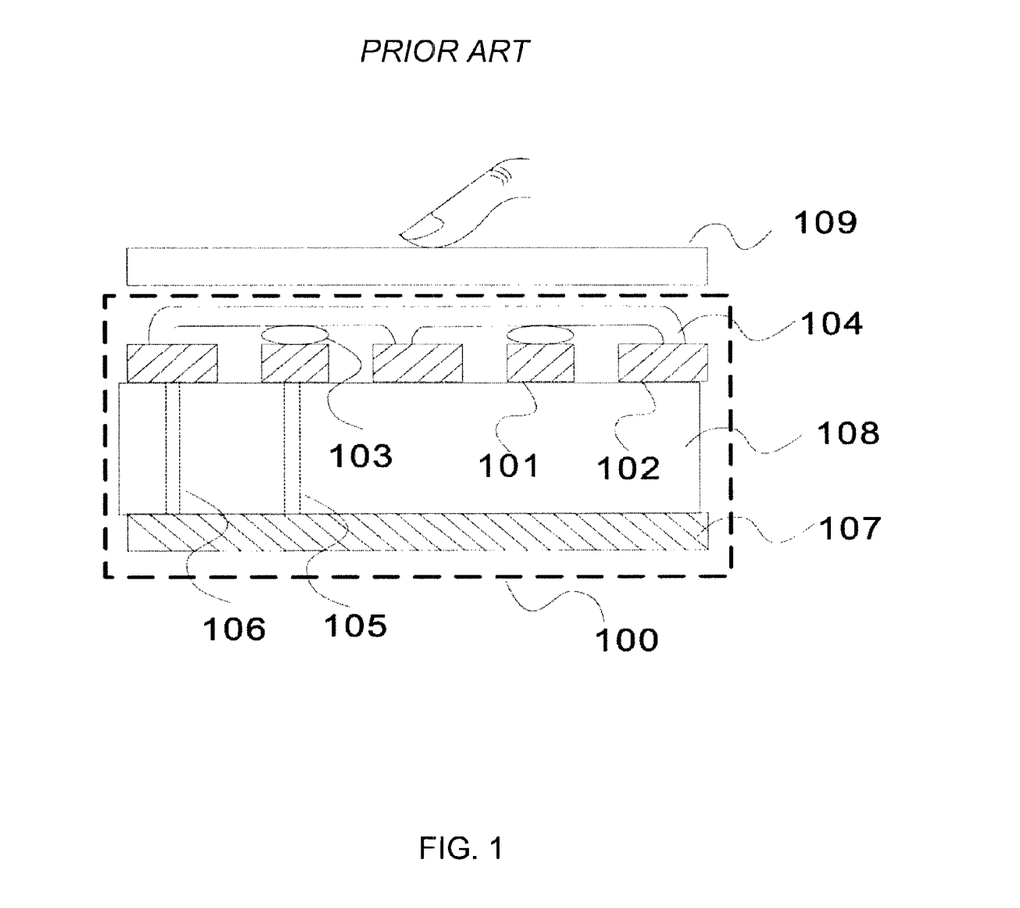
FIG. 1 is a diagram to show the touchpad with a double-layer printed circuit board structure in the prior art.

An existing double-layer printed circuit board is shown in FIG. 1. The printed circuit board comprises: an X-axis touch-sensitive line 101; a Y-axis touch-sensitive line 102, wherein the touch-sensitive lines 101 and 102 are disposed on the upper layer of a printed circuit board 100; a component layer 107 disposed on the bottom layer of the printed circuit board 100; an insulating layer 108 disposed between the upper layer configured with the X-axis touch-sensitive line 101 and the Y-axis touch-sensitive line 102 and the component layer 107; and an insulating cover 109 attached to the top of the printed circuit board 100, wherein the insulating cover is configured to act as an operating area for touch pens or fingers. Because the X-axis touch-sensitive line 101 and the Y-axis touch-sensitive line 102 are disposed on the upper layer of the printed circuit board 100, to connect to the component layer 107 disposed on the bottom layer of the printed circuit board 100, the X-axis touch-sensitive line 101 and the Y-axis touch-sensitive line 102 must go through the through-holes 105 and 106, respectively. Further, the intersection of the X-axis touch-sensitive line 101 and the Y-axis touch-sensitive line 102 may induce a circuit short. Accordingly, the Y-axis touch-sensitive lines 102 are configured not to connect to each other directly. Instead, the Y-axis touch-sensitive lines 102 are configured to be connected by a carbon film wire 104 printed with carbon ink. Further, an insulator component 103 is disposed between the X-axis touch-sensitive line 101 and the carbon film wire 104 to prevent the circuit short.

The procedure of manufacturing the carbon film wire is complicated and the manufacturing cost is high. In addition, the carbon film wire will be gradually worn out during usage, which influences the electric characters of the carbon film, and further influences the stability of the entire touchpad. As a result, the life time of the touchpad is decreased.

SUMMARY OF THE INVENTION

To solve the above noted problem, the present invention provides a touchpad with a double-layer printed circuit board structure comprising: an upper layer; a bottom layer; a first conductor; and a second conductor; wherein the upper layer of the printed circuit board is configured to act as a touch-sensitive zone, and comprises a plurality of first conductive units, a first conductive wire and a plurality of second conductive units; the bottom layer of the printed circuit board comprises a wire connecting zone and a component zone, wherein the wire connecting zone further includes a second conductive wire and a connecting line configured to be electrically coupled to the component zone; and the first conductor and the second conductor are configured to connect the upper layer with the bottom layer; wherein the plurality of first conductive units are serially-connected via the first conductive wire to form a first touch-sensitive line, wherein the first touch-sensitive line is configured to be electrically coupled to the component zone via the first conductor; the plurality of second conductive units are serially-connected via the second conductive wire to form a second touch-sensitive line, wherein the second touch-sensitive line is configured to be electrically coupled to the component zone via the second conductor; and the second conductive wire is configured to be electrically coupled to at least one of the second conductive units via the second conductor.

In some embodiment, the touchpad further comprises an insulating layer attached to the surface of the upper layer, wherein the insulating layer is configured to act as a user-operation zone.

In another embodiment, the first touch-sensitive line is configured to be orthogonal to the second touch-sensitive line.

In another embodiment, the first conductor or the second conductor is one selected from the group consisting of a through-hole conductor, a wire conductor, a cylindrical conductor, a cubical conductor and a hexahedral conductor.

In the present invention, the plurality of first conductive units are serially-connected via the first conductive wire to form a first touch-sensitive line, wherein the first touch-sensitive line is configured to be electrically coupled to the component zone via the first conductor; the plurality of second conductive units are serially-connected via the second conductive wire to form a second touch-sensitive line, wherein the second touch-sensitive line is configured to be electrically coupled to the component zone via the second conductor; and the second conductive wire is configured to be electrically coupled to at least one of the second conductive units via the second conductor. As the present invention does not use a carbon film wire, the complexity problem in manufacturing the carbon film wire is solved, and the manufacturing cost is decreased. Accordingly, the life time of the touchpad is prolonged.

BRIEF DESCRIPTION OF THE DRAWINGS

Exemplary embodiments of the present invention will be described in detail based on the following figures, wherein.

DESCRIPTION OF THE EMBODIMENTS

Exemplary embodiments of the present invention will now be described in detail with reference to the accompanying drawings.

Figure 2:
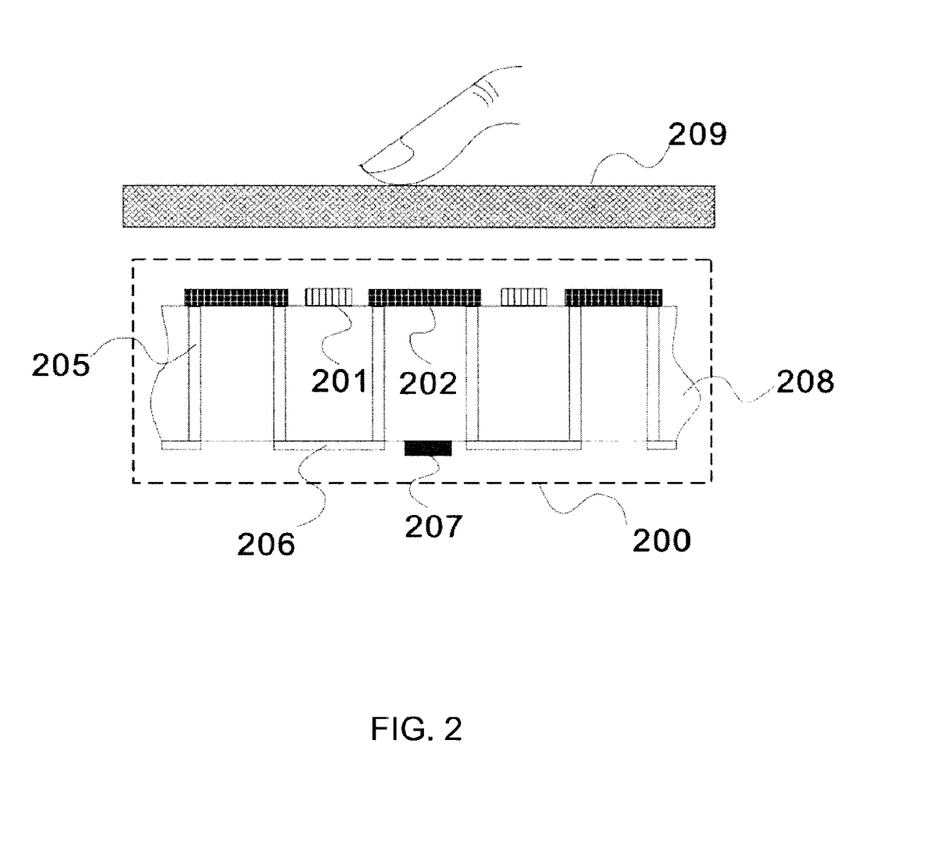
FIG. 2 is a diagram to show the touchpad with a double-layer printed circuit board structure in the present invention.

FIG. 2 is a diagram to show the touchpad with a double-layer printed circuit board structure of the present invention. The upper layer of the printed circuit board 200 is configured to act as a touch-sensitive zone, which comprises a plurality of first conductive units 201, a first conductive wire (not shown in FIG. 2) and a plurality of second conductive units 202. The bottom layer of the printed circuit board 200 comprises a wire connecting zone (partly shown in FIG. 2), and a component zone 207, wherein the wire connecting zone further includes a second conductive wire 206 and a connecting line configured to be electrically coupled to the component zone. Further, an insulating layer 208 is disposed between the upper layer and the bottom layer of the printed circuit board 200. Each first conductive unit 201 and each second conductive unit 202 are disposed on the upper layer of the printed circuit board 200, and the component zone 207 is disposed on the bottom layer of the printed circuit board 200. Therefore, each first conductive unit 201 and each second conductive unit 202 are configured to be electrically coupled to the component zone 207 via conductors. Each first conductive unit 201 is configured to be electrically coupled to the component zone 207 by the first conductor 204 (not shown in FIG. 2), and each second conductive unit 202 is configured to be electrically coupled to the component zone 207 by the second conductor 205. The first conductor or the second conductor is one selected from the group consisting of a through-hole conductor, a wire conductor, a cylindrical conductor, a cubical conductor and a hexahedral conductor. In some embodiment, the first conductor or the second conductor is configured as the through-hole conductor. In some embodiment, an insulating layer is attached to the surface of the upper layer, wherein the insulating layer is configured to act as a user-operation zone for fingers and touch pens.

Figure 3:
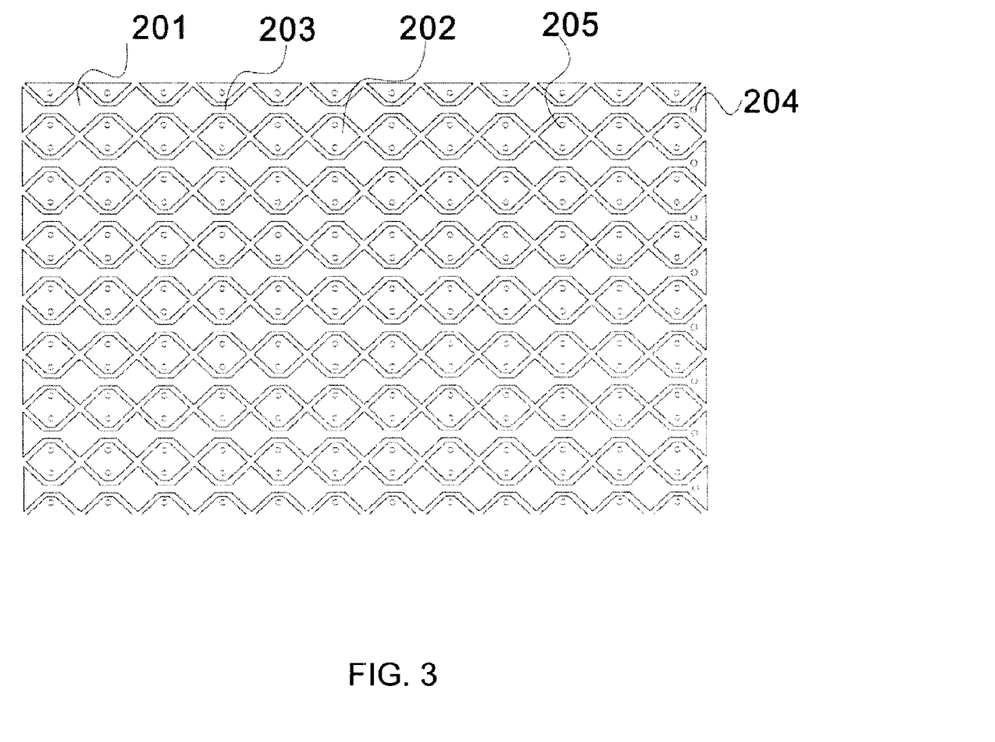
FIG. 3 is a diagram to show the structure of the upper layer of the touchpad with a double-layer printed circuit board structure in some embodiments of the present invention.
Figure 4:
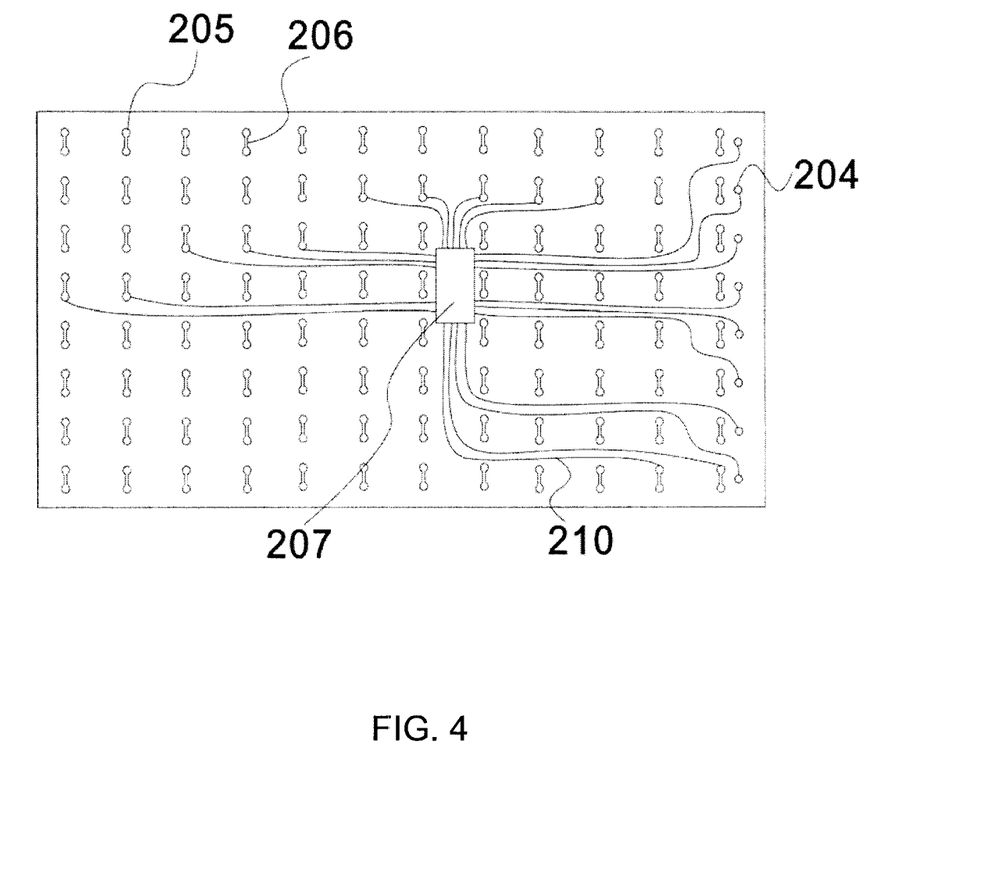
FIG. 4 is a diagram to show the structure of the bottom layer corresponding to the FIG. 3 of the present invention.

FIG. 3 is a diagram to show the upper layer of the touchpad with a double-layer printed circuit board structure in one of the embodiments of the present invention. FIG. 4 is a diagram to show the bottom layer corresponding to the FIG. 3 of the present invention. As shown in FIG. 4, the printed circuit board 200 comprises a first through-hole conductor 204 and a second through-hole conductor 205. Both through-hole conductors 204 and 205 are configured to connect the upper layer to the bottom layer of the printed circuit board. The bottom layer of the printed circuit board 200 further comprises a wire connecting zone 210 and a component zone 207 restricted by the wire connecting zone 210. As shown in FIG. 3, a plurality of first conductive units 201 are serially-connected via the first conductive wire to form a first touch-sensitive line, wherein the first touch-sensitive line is configured to be electrically coupled to the component zone 207 via the first through-hole conductor 204. As shown in FIG. 4, a plurality of respectively setting second conductive units 202 are serially-connected via the second conductive wire to form a second touch-sensitive line, wherein the second touch-sensitive line is configured to be electrically coupled to the component zone 207 via the second through-hole conductor 205. And the second touch-sensitive line 206 is connected to each second conductive unit 202 via the corresponding second through-hole conductor 205. Similarly, in another embodiment, each first conductive unit 201 is configured to be serially-connected by the first conductive wire 203 to form a Y-axis touch-sensitive line. And the Y-axis touch-sensitive line is configured to be connected to the component zone 207 via the first through-hole conductor 204. Further, each second conductive unit 202 is configured to be serially-connected by the second conductive wire 206 to form an X-axis touch-sensitive line, wherein, the X-axis touch-sensitive line is configured to be connected to the component zone 207 via the second through-hole conductor 205. And the second touch-sensitive line 206 is configured to be connected to each second conductive unit 202 via the corresponding second through-hole conductor 205. In some embodiment, the X-axis touch-sensitive line is configured to be orthogonal to the Y-axis touch-sensitive line.

Figure 5:
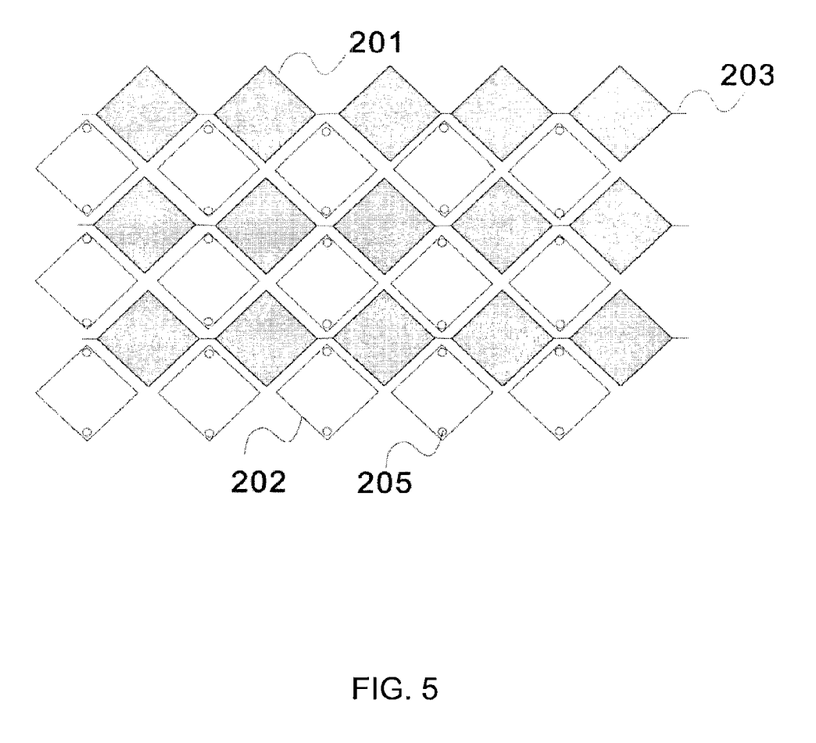
FIG. 5 is a diagram to show the structure of the upper layer of the touchpad with a double-layer printed circuit board structure in another embodiment of the present invention.
Figure 6:
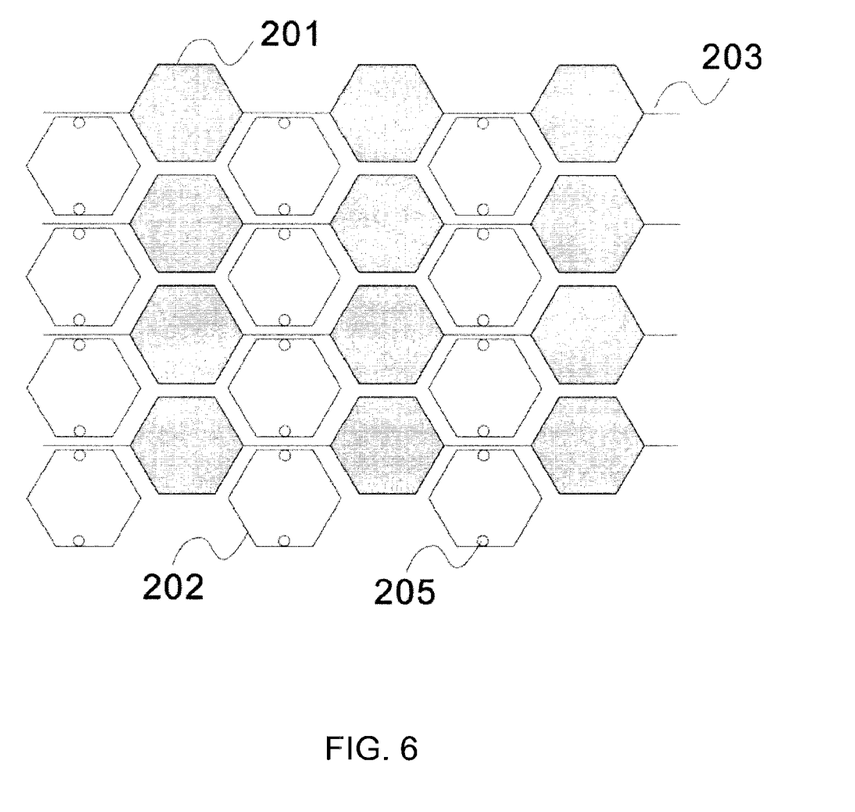
FIG. 6 is a diagram to show the structure of the upper layer of the touchpad with a double-layer printed circuit board structure in another embodiment of the present invention.
Figure 7:
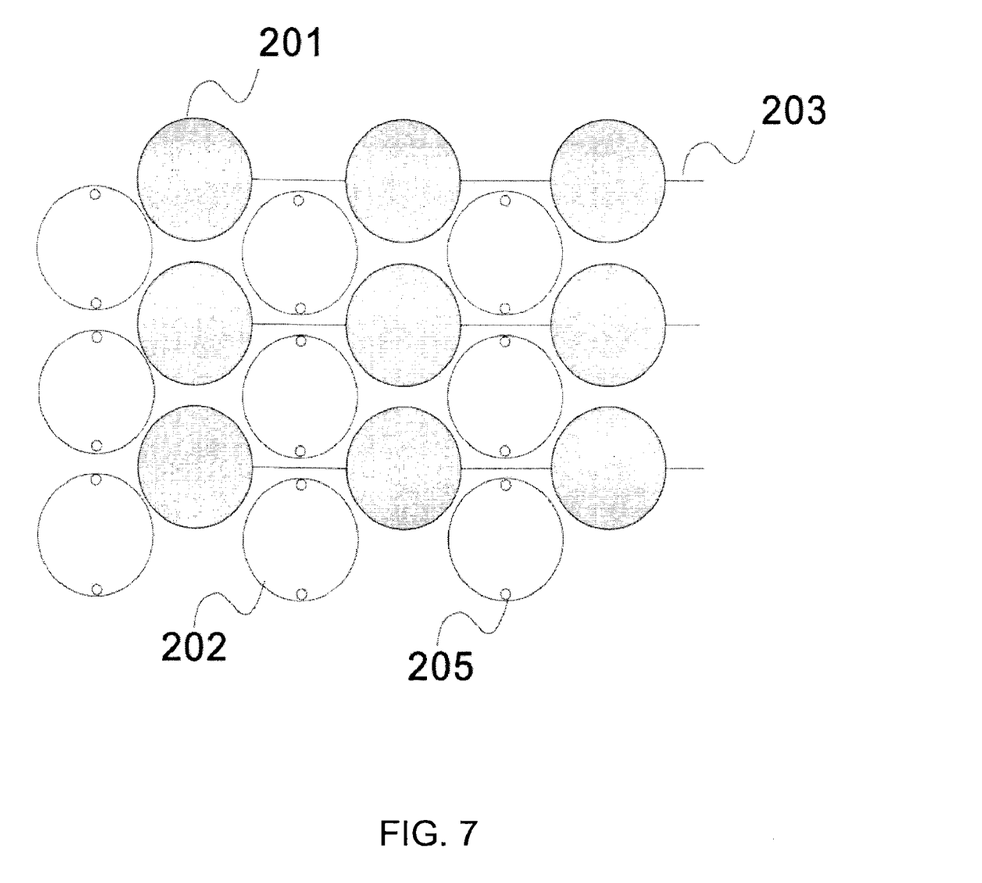
FIG. 7 is a diagram to show the structure schematic diagram of the upper layer of the touchpad with a double-layer printed circuit board structure in another embodiment of the present invention.

FIGS. 5-7 show the structures of the upper layer of the touchpad with a double-layer printed circuit board structure in another three embodiments of the present invention, respectively. As shown in FIG. 5, each of the first conductive unit 201 and the second conductive unit 202 is in a shape of a rhombus. Each first conductive unit 201 is configured to be serially-connected through the first conductive wire 203, and further to form a X-axis touch-sensitive line; and each second conductive unit 202 is configured to be serially-connected through the second conductive wire 206 (shown in FIG. 4) to form a Y-axis touch-sensitive line; wherein the second touch-sensitive line 206 is configured to be connected to each second conductive unit 202 via the corresponding second through-hole conductor 205. To achieve the shortest length for the first conductive wire 203 and the second touch-sensitive line 206, the first conductive wire 203 is configured to connect the two closest angles of two respective first conductive units 201; and the second through-hole conductor 205 is configured to be disposed on an angle of each second conductive unit 202. As the lengths of the first conductive wire 203 and the second touch-sensitive line 206 are the shortest, the resistances of the first conductive wire 203 and the second touch-sensitive line 206 become small. Therefore, the efficiency of using the touchpad is greatly improved.

As shown in FIG. 6, each of the first conductive unit 201 and the second conductive unit 202 is in a shape of a hexagon. To achieve the shortest length for the first conductive wire 203 and the second touch-sensitive line 206, the first conductive wire 203 is configured to connect the two closest angles of two respective first conductive units 201; and the second through-hole conductor 205 is configured to be disposed in the mid of an edge of each second conductive unit 202, wherein the edge is closest in distance to the neighboring second conductive unit 202. As the lengths of the first conductive wire 203 and the second touch-sensitive line 206 are the shortest, the resistances of the first conductive wire 203 and the second touch-sensitive line 206 become small. Therefore, the efficiency of using the touchpad is greatly improved.

As shown in FIG. 7, each of the first conductive unit 201 and the second conductive unit 202 is in a shape of a circle. The connecting line between two respective first conductive units 201 passes through the center of the circle; and the connecting line between two respective second through-hole conductors 205 disposed on the second conductive units 202 also passes through the center of the circle. As the lengths of the first conductive wire 203 and the second touch-sensitive line 206 are the shortest, the resistances of the first conductive wire 203 and the second touch-sensitive line 206 become small. Therefore, the efficiency of using the touchpad is greatly improved.

The foregoing description, for the purpose of explanation, has been described with reference to the specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A touchpad with a double-layer printed circuit board structure comprising:
    an upper layer;
    a bottom layer;
    a plurality of first conductors between the upper layer and the bottom layer; and
    a plurality of second conductors between the upper layer and the bottom layer;
    wherein
        the upper layer of the printed circuit board is configured to act as a touch-sensitive zone, and comprises a plurality of first conductive units along a first axis, a plurality of first conductive wires along the first axis and a plurality of second conductive units along a second axis;
        the bottom layer of the printed circuit board comprises a wire connecting zone and a component zone defined by the wire connecting zone, wherein the wire connecting zone further includes a plurality of second conductive wires along the second axis; and
    wherein
        the plurality of first conductive units are serially-connected via the plurality of first conductive wires to form a first touch-sensitive line, wherein the first touch-sensitive line is configured to be electrically connected to the component zone via the plurality of first conductors between the upper layer and the bottom layer and a plurality of first wires between the plurality of first conductors and the component zone; and
    the plurality of second conductive units are serially-connected via the plurality of second conductive wires in the bottom layer and the plurality of second conductors between the upper layer and the bottom layer to form a second touch-sensitive line, wherein the second touch-sensitive line is configured to be electrically connected to the component zone via a plurality of second wires between the plurality of second conductors and the component zone.

2. The touchpad with a double-layer printed circuit board structure of claim 1, further comprising an insulating layer attached to the surface of the touch-sensitive zone, wherein the insulating layer is configured to act as a user-operation zone.

3. The touchpad with a double-layer printed circuit board structure of claim 1, wherein the first touch-sensitive line is configured to be orthogonal to the second touch-sensitive line.

4. The touchpad with a double-layer printed circuit board structure of claim 1, wherein each of the plurality of first conductors is one selected from the group consisting of a through-hole conductor, a wire conductor, a cylindrical conductor, a cubical conductor and a hexahedral conductor.

5. The touchpad with a double-layer printed circuit board structure of claim 1, wherein each of the plurality of second conductors is one selected from the group consisting of a through-hole conductor, a wire conductor, a cylindrical conductor, a cubical conductor and a hexahedral conductor.

6. The touchpad with a double-layer printed circuit board structure of claim 1, wherein each first conductive unit is in a shape of a polygon selected from the group consisting of a diamond, a square, a rectangle, and a hexagon.

7. The touchpad with a double-layer printed circuit board structure of claim 6, wherein the polygon is a regular polygon.

8. The touchpad with a double-layer printed circuit board structure of claim 1, wherein each first conductive unit is in a shape of a circle or an ellipse.

9. The touchpad with a double-layer printed circuit board structure of claim 1, wherein each second conductive unit is in a shape of a polygon selected from the group consisting of a diamond, a square, a rectangle, and a hexagon.

10. The touchpad with a double-layer printed circuit board structure of claim 9, wherein the polygon is a regular polygon.

11. The touchpad with a double-layer printed circuit board structure of claim 1, wherein each second conductive unit is in a shape of a circle or an ellipse.

* * * * *